April 5, 1927.
A. TOVALIN
THERMOGLUE VESSEL
Filed April 22, 1926
1,623,763
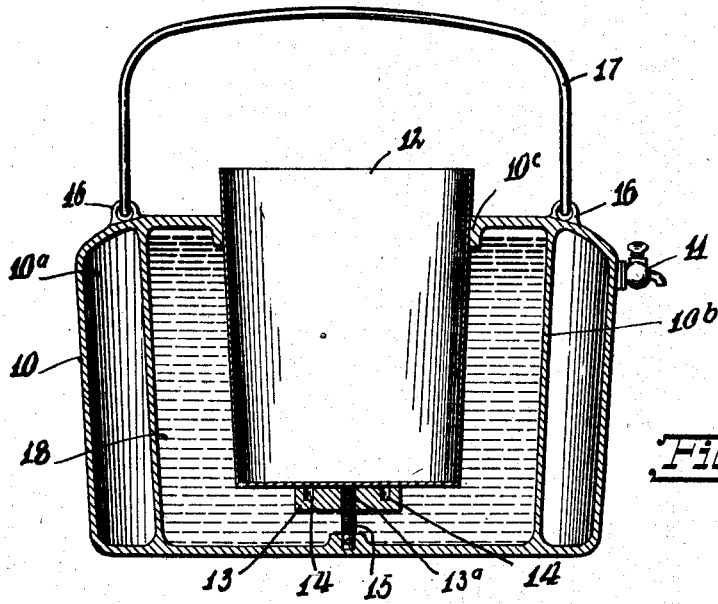
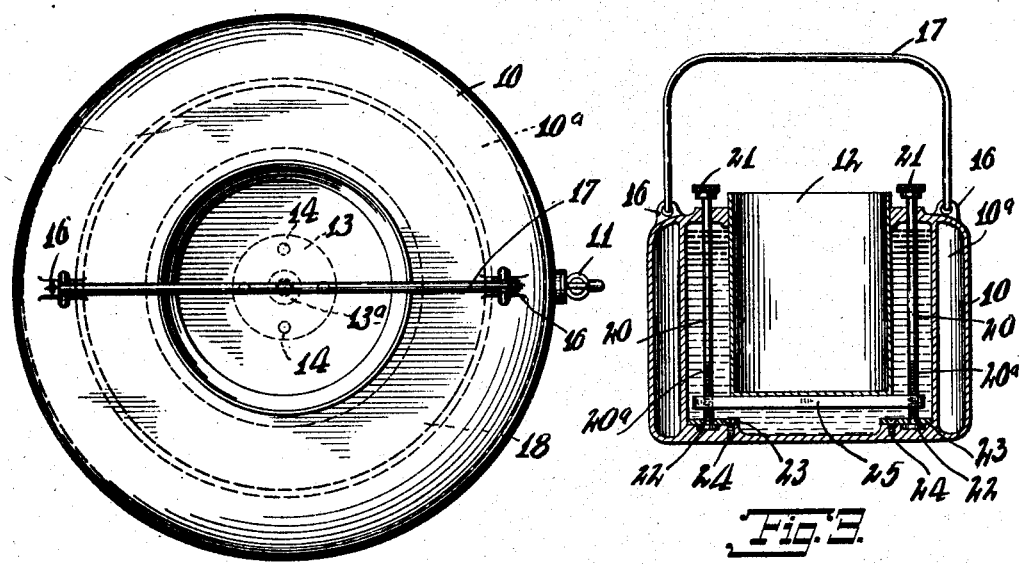
INVENTOR
Angel Tovalin
BY
ATTORNEY Patented Apr. 5, 1927.

1,623,763

UNITED STATES PATENT OFFICE.

ANGEL TOVALIN, OF MONTEREY, MEXICO.

THERMOGLUE VESSEL.

Application filed April 22, 1926. Serial No. 103,672.

This invention relates to vessels, particularly adapted to properly heat glue, or the like, the invention having for an object the provision of a novel and improved vessel of this type.

For further comprehension of the invention, and of the objects and advantages thereof, reference will be had to the following description and accompanying drawing, and to the appended claims in which the various novel features of the invention are more particularly set forth.

Referring to the accompanying drawing forming a material part of this disclosure, Fig. 1 is a central vertical sectional view of a vessel incorporating the principles of this invention.

Fig. 2 is a top view thereof.

Fig. 3 is a central vertical sectional view of a vessel incorporating the principles of this invention in a modified form.

As herein embodied the vessel 10, made of any suitable material, is formed with a circular chamber $10^a$, the height of the vessel, by means of a circular partition $10^b$ extending from the bottom to the top of said vessel. This chamber $10^a$ is provided with a suitable valve 11, allowing an opening thru which the air within the chamber may be exhausted to form a vacuum chamber. The top of the vessel 10 being provided with an aperture $10^c$ adapted to receive a glue container 12, which rests on an adjustable support 13, having a plurality of apertures 14 to receive a tool for turning purposes, and a central threaded aperture $13^a$, engaging a vertically positioned stud 15 fixed to the bottom of said vessel. Eyes 16 integral to the top of the vessel engage a handle 17 to facilitate the handling of the device, the vessel 10 being provided with water 18, or any other suitable similar material.

In the modification shown in Fig. 3, an improved form of an adjustable support for the glue container 12 is provided. Rotatable vertical rods 20 have their upper ends projecting thru the vessel, and equipped with knurled heads 21, while the lower ends are formed with disc heads 22, rotatable in circular recesses in the bottom of the vessel, and properly held by closure straps 23 fastened to the vessel by screws 24. The rods 20 are formed with threads $20^a$ engaging threaded apertures in a support 25 on which the glue container seats.

In operation the adjustable support is properly positioned to seat the glue container, the water being brought up to a temperature suitable to have the glue in the proper plastic condition, by means of external heat. The rate of heat radiation from the water will be minimized due to the vacuum chamber $10^a$ surrounding the water chamber, and the glue will retain its condition for a satisfactory length of time.

While I have illustrated and described my invention with some degree of particularity, I realize that in practice various alterations therein may be made, I therefore reserve the right and privilege of changing the form of the details of construction or otherwise altering the arrangement of the correlated parts without departing from the spirit or the scope of the appended claims.

Having thus described my invention, what I claim as new, and desire to secure by United States Letters Patent is:—

1. In a device of the class described, an outer container comprising an inwardly directed upper flange, said flange being provided with spaced openings, substantially vertical screw threaded rods journaled in said spaced openings comprising screw threaded lower portions, a support disposed in said container and screw threaded on the lower portions of said rods, knobs on the upper ends of said rods, above said container for rotating the former to adjustably position said support, and a removable container disposed in said outer container having side portions in engagement with the edge of said flange adapted to be raised and lowered by adjustment of said support.

2. In a device of the class described, an outer container adapted to retain a heating medium comprising a cylindrical vessel, an inwardly directed flange disposed around the upper end of said vessel comprising an enlarged edge portion, rods journaled in openings in said flange comprising screw threaded lower portions, a platform disposed in said outer container adjustably supported by said rods adapted to be raised and lowered by rotation thereof, means on the upper ends of said rods above said outer container for rotating the former to suitably position said platform, and an inner container supported by said platform adapted to be raised and lowered therewith for suitably immersing said inner container in the heating medium in said outer container, the sides of said inner container being engaged by the enlarged edge of said flange.

3. In a device of the class described, an outer container comprising a vacuum chamber and an inner chamber, a heating medium in said inner chamber, an adjustable platform disposed in said inner chamber, means comprising rods journaled in said outer container and extending thereabove for adjustably positioning said platform, and an inner container adapted to rest upon said platform and to be immersed to a suitable degree in said heating medium by adjustment of said platform.

In testimony whereof I have affixed my signature.

ANGEL TOVALIN.